United States Patent Office 3,390,126
Patented June 25, 1968

3,390,126
BLOOM CONTROL FOR SULFUR CURABLE SYNTHETIC ELASTOMERS
Bernard J. Davis, Houston, Tex., assignor to Reichhold Chemicals, Inc., White Plains, N.Y.
No Drawing. Filed Apr. 26, 1965, Ser. No. 451,044
12 Claims. (Cl. 260—79.5)

ABSTRACT OF THE DISCLOSURE

A process for controlling bloom in sulfur curable synthetic elastomers which comprises sulfur curing such elastomers in the presence of a small quantity of a bloom reducing agent comprising a hydroxy alkyl ether of a dihydric phenol.

---

The invention relates to a process for controlling the blooming characteristics of sulfur curable synthetic elastomers such as ethylene propylene terpolymers (EPT), butyl rubber, and the like. The above elastomers are mentioned as illustrative only of suitable sulfur curable synthetic elastomers since any such sulfur curable elastomers may be improved by using the bloom reducing agent herein set forth.

Sulfur curable synthetic elastomers such as ethylene propylene terpolymers and butyl rubber are well known, the former being referred to, for example, in U.S. Patent No. 3,093,620, and the latter being referred to, for example, in U.S. Patent No. 2,702,286.

More specifically my invention relates to the control or reduction of bloom in sulfur curable synthetic elastomers or rubbers by carrying out the usual sulfur curing operation, preferably with the aid of an accelerator, in the presence of a small quantity, preferably within the range of .5 to 5 parts (desirably within the range of 1 to 2 parts) per hundred parts by weight of the elastomer, of a bloom control agent comprising a mono or diether of a dihydric phenol such as catechol, resorcinol, bisphenol or hydroquinone, wherein the etherifying agent is an alkylene oxide, such as ethylene oxide or propylene oxide, or their polymers or copolymers. The bloom control agent may be referred to as a hydroxy alkyl ether of a dihydric phenol. Especially suitable as the bloom control agent for the sulfur curable synthetic elastomers herein set forth are the monohydroxypropyl ether of $p_1p^1$-isopropylidenediphenyl and the bishydroxypropyl ether of $p_1p^1$-isopropylidenediphenyl.

In the prior art, when ethylene-propylene terpolymer rubber has been cured in a normal filled stock and when the curing system consisted of sulfur, mercaptobenzothiazole and tetramethyl thiuram disulfide, an unattractive bloom of a white to yellow powder develops on the cured rubber, producing an unsightly product. This bloom has been tentatively identified as a zinc salt of tetramethyl thiuram disulfide. The bloom can of course be eliminated by employing other more costly and less efficient vulcanizing systems, but the resultant compound is more costly.

The bloom can also be controlled, but rather inefficiently by the addition of polyether waxes such as Carbowax, but in this case, the polyether waxes cause a retardation of cure and destroy the much desired building or green tack in the compound.

I have found that compounds falling in the general class of the following structure are extremely efficient bloom control agents, in that they are effective at loadings as low as 1 part per 100 parts of rubber, they do not destroy, but rather enhance building tack, and they permit and are effective in short high temperature cures, where other products have failed.

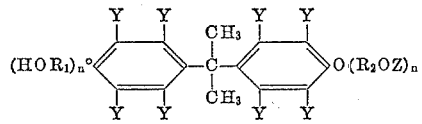

where $R_1$ and $R_2$ can be methyl, ethyl or propyl groups or polyoxides of these alkyls, where $n$ can be any integer from 1 to 8, where Z can be hydrogen or an alkyl up to $C_5$ and where Y can represent singly or multiply hydrogen or alkyls up to $C_6$ also included are structures such as:

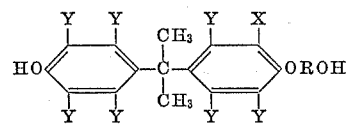

where R can be ethyl, propyl or butyl or polyoxides of these alkyls, where Y singly or multiply can represent hydrogen, methyl, ethyl or alkyls up to $C_6$.

One of the simplest products that can be prepared to fit this description is the monohydroxypropyl ether of $p$-$p^1$-isopropylidenediphenyl.

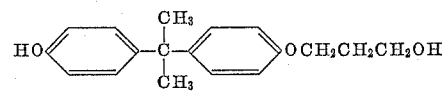

another is the bishydroxypropyl ether of $p$-$p^1$-isopropylidenediphenyl

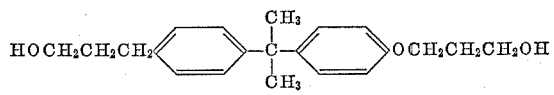

I have found that white or non-black filled stocks, particularly in short cures require the diether, while black stocks in all length cures and white stocks in long cure respond favorably to the monoether.

The following recipe is typical of the stocks tested and demonstrate the effectiveness of the compounds described in controlling bloom on cure of ethylene propyleneterpolymer. I have also found these compounds to be effective in eliminating bloom in butyl rubber as well.

NON-BLACK-MINERAL FILLED STOCK

|  | Control | Test #1 | Test #2 |
|---|---|---|---|
| E.P.T. | 100 | 100 | 100 |
| Iceberg Clay | 175 | 175 | 175 |
| Process Oil | 75 | 75 | 75 |
| Zinc Oxide | 5 | 5 | 5 |
| Thiuram M | 2.5 | 2.5 | 2.5 |
| Mercapto benzothiazole | 1 | 1 | 1 |
| Sulfur | 2 | 2 | 2 |
| Monohydroxy propyl ether |  | 2 |  |
| Dihydroxy propyl ether |  |  | 2 |
| Bloom after 24 hrs., following cure of 15′ at 320° F. | (1) | (2) | (2) |
| Bloom after 24 hrs., following cure of 5′ at 320° F. | (1) | (3) | (2) |

BLACK STOCK

|  | Control | Test #3 |
|---|---|---|
| E.P.T. | 100 | 100 |
| FEF Black | 80 | 80 |
| Process Oil | 40 | 40 |
| Zinc Oxide | 5 | 5 |
| Thiuram M | 2.5 | 2.5 |
| Mercapto benzothiazole | 1 | 1 |
| Sulfur | 2 | 2 |
| Monohydroxy propyl ether |  | 2 |
| Bloom after 24 hrs. following cure of 15′ at 320° F. | Heavy | None |
| Bloom after 24 hrs. following cure of 5′ at 320° F. | Heavy | None |

[1] Heavy bloom.
[2] No bloom.
[3] Very slight bloom.

It is also to be noted that in order to be effective, the ethers did not have to be made chemically pure, hence the pure or crude ethers as produced can be employed.

I employed the following methods for preparing the ethers for these tests:

Preparation of the crude monohydroxypropyl ether.—
Example #I

Into a two-liter three necked round-bottom flask, equipped with a mechanical stirrer, an inlet tube for nitrogen gas, a reflux condenser, a thermometer and a dropping funnel, were placed 685 gms. (3.0 moles) of Bisphenol A and 10 ml. of 50% NaOH solution. The contents were heated under nitrogen to approximately 160° C. until uniformly liquid.

174 gms. (3.0 moles) of propylene oxide were added dropwise at 160–167° C. in two hrs. Approximately 22 gms. of propylene oxide were lost during the addition. An additional 30 gms. of propylene oxide were added in 30 minutes. The reaction mixture was then maintained above 160° C. (approximately 165° C.) for 15 minutes. The weight increase over the initial weight of Bisphenol A and caustic amounted to 178 gms.

For this procedure catalysts other than NaOH can be employed. For example KOH, tertiary amines, $BF_3$ non-methyl amine complex, quaternary amines and even super-atmospheric pressure can be employed. Instead of propylene oxide, ethylene oxide can be used. Other dihydrin phenols such as catechol, resorcinol, bisphenol, or hydroquinone can be used.

The reaction can also be run in the presence of xylol so that the pure ether can be separated. In the foregoing example, the ether actually contains a small percentage of unreacted bisphenol A, the diether and the residual catalyst.

Preparation of the bishydroxypropyl ether.—
Example #II

Into the same equipment as described in Example I is added 685 gms. (3.0 moles) of bisphenol A and 10 ml. of 50% NaOH solution. The contents are heated to 160° C., and then 384 gms. (6.0 moles) of propylene oxide is added over a period of 3 hours. Approximately 40 gms. of oxide were lost during addition. An additional 55 gms. propylene oxide were added in 30 minutes, and a temperature of 165° C. was maintained for 15 more minutes. The weight increase amounted to 396 gms.

I claim:

1. A process for controlling bloom in sulfur curable synthetic elastomers which comprises sulfur curing such elastomers in the presence of a small quantity of a bloom reducing agent comprising a hydroxyl alkyl ether of a dihydric phenol.

2. A process for controlling bloom in sulfur cured synthetic rubbers selected from a group consisting of ethylene-propylene terpolymers and butyl rubber, which comprises sulfur curing the respective ingredients with the aid of an accelerator in the presence of a small quantity of a bloom reducing agent which is a member of a group consisting of mono and diethers of dihydric alcohols etherified with a member of a group consisting of ethylene oxide, propylene oxide and their poly and copolymers.

3. A process as set forth in claim 2 wherein the rubber being cured is an ethylene-propylene terpolymer.

4. A process as set forth in claim 2 wherein the rubber being cured is a butyl rubber.

5. A process as set forth in claim 1 wherein the dihydric Bisphenol A.

6. A process as set forth in claim 2 wherein the bloom reducing agent is a monohydroxy ether.

7. A process as set forth in claim 2 wherein the bloom reducing agent is a hydroxyl terminated ether.

8. A process as set forth in claim 1 wherein the bloom controlling agent is used in the proportion of about .5 to 5 parts per hundred parts by weight of the elastomer being treated.

9. A process as set forth in claim 1 wherein the bloom controlling agent is used in the proportion of about 1–2 parts per hundred parts by weight of the elastomer being treated.

10. A process as set forth in claim 1 wherein the bloom controlling agent is used in the proportion of about 2 parts per hundred parts by weight of the elastomer being treated.

11. A non-blooming synthetic elastomer composition comprising (1) a sulfur curable synthetic elastomer, (2) sulfur, (3) an accelerator, and (4) a bloom reducing agent comprising a hydroxyl alkyl ether of a dihydric phenol.

12. A non-vulcanized curable synthetic rubber composition comprising (1) a member of a group consisting of ethylene-propylene terpolymers and butyl copolymers, (2) sulfur, (3) an accelerator, and (4) a small quantity of a bloom reducing agent seelcted from a group consisting of mono and diethers of dihydric alcohols etherified with a member of a group consisting of ethylene oxide, propylene oxide and their poly and copolymers.

References Cited

UNITED STATES PATENTS

| | | | |
|---|---|---|---|
| 2,877,209 | 3/1959 | Jansen et al. | 260—79.5 |
| 2,947,789 | 8/1960 | Ambelang | 260—79.5 |
| 3,322,718 | 5/1967 | Jacob | 260—45.95 |

JOSEPH L. SCHOFER, *Primary Examiner.*

J. A. SEIDLECK, *Examiner.*

D. K. DENENBERG, *Assistant Examiner.*